(12) United States Patent
Tarbet et al.

(10) Patent No.: US 6,372,145 B1
(45) Date of Patent: Apr. 16, 2002

(54) FAT AND PROTEIN REMOVAL FROM PROCESS STREAMS

(75) Inventors: Bryon J. Tarbet, Highland; Robert D. Hancock, Pleasant Grove; Jeffrey W. Zidek, Salt Lake City, all of UT (US)

(73) Assignee: Power Engineering Company, Salt Lake City, UT (US)

( * ) Notice: Subject to any disclaimer, the term of this patent is extended or adjusted under 35 U.S.C. 154(b) by 0 days.

(21) Appl. No.: 09/587,533

(22) Filed: Jun. 5, 2000

(51) Int. Cl.$^7$ .................................................. C02F 1/56
(52) U.S. Cl. ....................... 210/710; 210/725; 210/727; 210/730; 210/734; 210/905; 426/657; 530/420; 530/421; 530/859
(58) Field of Search .................. 210/710, 705, 210/725, 727, 728, 730, 734, 735, 905; 426/656, 657; 530/412, 418, 420, 421, 859

(56) References Cited

U.S. PATENT DOCUMENTS

| | | | | |
|---|---|---|---|---|
| 2,300,693 A | | 11/1942 | Oswald et al. .................. | 210/1 |
| 4,013,555 A | * | 3/1977 | Davis .......................... | 210/725 |
| 4,061,568 A | | 12/1977 | Hall ............................ | 210/44 |
| 4,565,635 A | * | 1/1986 | Le Du et al. ................. | 210/727 |
| 5,200,085 A | | 4/1993 | Rudolf et al. ................. | 210/703 |
| 5,204,007 A | | 4/1993 | Mosley et al. ................ | 210/705 |
| 5,269,939 A | | 12/1993 | Laurent et al. .............. | 210/705 |
| 5,443,730 A | | 8/1995 | Letourneux et al. ......... | 210/631 |
| 5,451,326 A | | 9/1995 | Carlson et al. .............. | 210/708 |
| 5,500,131 A | | 3/1996 | Metz ........................... | 210/705 |
| 5,514,282 A | | 5/1996 | Hibbard et al. .............. | 210/652 |
| 5,543,058 A | * | 8/1996 | Miller ......................... | 210/725 |
| 5,741,426 A | | 4/1998 | McCabe et al. .............. | 210/707 |
| 5,750,033 A | | 5/1998 | Ikeda et al. .................. | 210/711 |
| 5,827,432 A | | 10/1998 | Huhtamaki et al. ......... | 210/705 |
| 5,830,388 A | | 11/1998 | Kigel et al. .................. | 252/358 |
| 5,904,856 A | | 5/1999 | Kvant et al. ................. | 210/716 |
| 5,914,040 A | | 6/1999 | Pescher et al. .............. | 210/638 |
| 5,958,248 A | | 9/1999 | Satoh .......................... | 210/725 |

* cited by examiner

Primary Examiner—Peter A. Hruskoci
(74) Attorney, Agent, or Firm—Workman, Nydegger & Seeley

(57) ABSTRACT

The precipitation and removal of suspended fat and protein components and other suspended solids from a given solution can be accomplished by the addition of an aluminate to complex with the fat and protein components and the addition of a flocculating agent to flocculate the aluminate/fat and protein component complexes into insoluble particles capable of removal by conventional technology, which insoluble particles can be rendered to produce tallow.

9 Claims, No Drawings

FAT AND PROTEIN REMOVAL FROM PROCESS STREAMS

BACKGROUND OF THE INVENTION

The present invention relates generally to methods or process for the precipitation and removal of fat and protein which contribute to the chemical oxygen demand ("COD") or biological oxygen demand ("BOD") from a wide range of process streams along with the removal of other suspended solids. This process utilizes the unique characteristics of the aluminate ion ($Al(OH)_4^-$) to facilitate efficient, cost effective removal of the quite valuable fat and protein.

The presence of fat and protein in industrial process streams represents significant environmental problems due to the COD/BOD levels resulting from the fat and protein's presence since these materials are aerobically decomposed. These components decompose slowly but still contribute significantly to the COD burden of a given stream. Additionally, the presence of fats in process streams coats the process equipment and prevents this equipment from functioning at peak efficiency.

Increasingly stringent regulations on the COD/BOD levels in water which can be discharged into the environment places many facilities presently outside of compliance with these environmental regulations. The presence of fat and protein components in any given process stream may result from a wide variety of input sources and is commonly found in waste water from animal slaughterhouses and food processing facilities.

Equally important to the environmental problems these fat and protein components can create, they inherently have value within the marketplace. Therefore, recovery of the large amounts of these materials which is presently being lost would potentially create additional sources of revenue to a large number of facilities.

The relatively large pieces of pure fat may be, and typically are readily removed through filtration, floatation or settling. However the small, suspended and dissolved fat and protein components intermixed with other suspended solids such as dirt, silica, each other or any other process component typically cannot be removed by simple filtration, flocculation, or settling. Consequently more extreme measures must be taken in order to remove these suspended particles.

It is known that acid hydrolyzing metal salts such as iron, particularly when added as ferric ($Fe^{3+}$), can be used as a flocculation agent, but the iron then acts as a catalyst for the auto-oxidation of the fatty substances and thereby reduces the value of the subsequently recovered materials. The art also teaches that aluminum, particularly when added as free, uncomplexed aluminum ion ($Al^{3+}$), like the iron, also acts as a catalyst for the auto oxidation of the fatty substances. This auto-oxidation of the fatty substances is particularly problematic where the recovered materials are rendered. During rendering the recovered fatty materials are cooked to remove the water and melt the fat, thereby creating a rough separation of the fat from the other materials. Ultimately the recovered materials can be used as animal feed, and if the recovered fat is of sufficient quality it can also be sold as tallow, with its purity determining its market value.

Some facilities presently resort to simply dumping large quantities of high COD creating fat and protein containing water into municipal water systems, thereby placing significant strain on downstream purification processes. Other facilities must construct large dumping ponds into which the waste water is pumped. While such ponds prevents the waste water from introduction into lakes, rivers and streams, it not only prevents the reuse of large volumes of process water and can result in the release of significant odors which make it undesirable in even sparsely populated regions, but these ponds ultimately fill with organic sediment and require routine and costly dredging.

Other processes, such as ultrafiltration, can ultimately remove almost any suspended solid particle, even the suspended fat and proteins. While ultrafiltration can reduce the total suspended solids (TSS) within a process stream, it is typically unable to effectively reduce the COD content created by dissolved particles and components, sometimes referred to as the total dissolved solids (TDS).

While traditional and known methods can significantly reduce the quantity of water required in a given process and prevent the discharge of high COD water into the environment, the high cost of capital equipment, maintenance and operation make such processes prohibitively expensive for a large number of applications.

A process capable of easy, efficient removal of suspended fat and protein components from a wide range of industrial process streams thereby allowing not only the discharge of said streams into the environment or reuse and recycle of said streams, but also facilitating recovery of the discarded fat and protein materials would be a great advancement in the art.

SUMMARY AND OBJECTS OF THE INVENTION

The present invention provides a method or process for the precipitation or coagulation and easy removal of suspended fat and protein containing particles and components, which organic matter creates high quantities of Chemical Oxygen Demand ("COD") or Biological Oxygen Demand ("BOD"), as well as other suspended solids from a given solution. The process includes the addition of aluminate, typically added as sodium aluminate $Na(Al(OH)_4)$), followed by the addition of a flocculating agent, typically anionic or cationic polymers such as polyacrylamides, polycarboxylates, and polyamines or even the naturally occurring polymer pectin.

Once the aluminate is added a flocculating agent is then added to create large, suspended flocculate particles. The precise solution pH will be a function mainly of the quantity of aluminate added and the type of flocculating agent used. Generally, after the aluminate is added the solution pH will be between about 4 and 10. Where cationic flocculating agents are used, the pH of the solution will generally be between about pH 4 and 8 when the flocculate is formed, although, since the cationic flocculating agents are not as pH sensitive as their anionic counterparts, the cationic flocculating agents are capable of effective removal up to about pH 9–10. Where anionic flocculating agents are used, the pH of the solution will generally be greater than about pH 5 when the flocculate is formed.

One skilled in the art will recognize that because aluminate itself (as well as other bases) can be used to raise a solution's pH, even solutions whose pH is considerably below 4 can be effectively treated. Additionally, while removal of the protein and fat components is not as complete where the aluminate is added above pH 8, removal can nonetheless be effected even at pH's above 10.

The flocculating agent's interaction with the aluminate associated with the fat and protein components produces a large, neutral and substantially organic complex which is insoluble in the solution and which will more easily precipitate or coagulate so as to assist in removing the fat and protein materials from the solution. As the flocculating agent precipitates the fat and protein components, it will also capture the other suspended solids such as silica, dirt, etc.

Different types of flocculating agents can be employed to produce the desired precipitation. Typically, large synthetic organic polymers will be used depending on the quantity of aluminate used, and the solution pH. Additionally, naturally occurring polymers, such as pectin, can also be used as a flocculent to provide an all "natural" process free of "man-made" chemicals.

Once the suspended fat and protein components have been precipitated into larger, more easily filtered particles, they can be readily removed by flotation, filtration or other known methods in the art.

Once the fat and protein have been removed from the process stream, this material can be either immediately used as animal feed, or it can be rendered. The process of rendering heats the recovered material, driving out the noncomplexed water and can be further used to melt the fat and perform an initial separation of the fat from the protein. Once the melted fat has been separated it can then be sold as tallow, with the remaining protein rich components typically still usable as animal feed.

Contrary to the suggestions within the art, the $Al^{3+}$ within the aluminate does not create or catalyze an auto-oxidation of the fatty substances within the flocculate particles. Rather, the aluminate provides for a process which requires substantially less metal salt addition and substantially less reaction time for successful flocculation when compared to uncomplexed $Al^{3+}$ added, for example, as a chloride, hydroxide or sulphate.

With the fat and protein components and other suspended particles now precipitated and removed from the process stream, the process stream water poses less of an environmental threat upon its discharge into natural waterways, or else can be recycled or otherwise reused as desired within existing process.

Accordingly, an object of the present invention is to create a process which produces readily removable precipitated fat and protein components and other suspended solids to facilitate the easy removal of these particles.

Yet another object of the present invention is to create a process which allows for the reuse and recycle of the water in process streams initially containing high amounts of organic particles and components by reducing the fat and protein component content, thereby facilitating recycling of the process stream and thereby reducing the quantity of water required by a process.

It is a further object of the present invention to create a process which produces product which can be readily incorporated into animal feed and/or rendered into tallow.

It is yet another object of the present invention to create a process for removal of the COD/BOD content created from fat and protein components from water without adding additional contaminants to the water whereby disposal of water into the environment is hampered.

It is yet another object of the present invention to create an all natural process for removal of the fat and protein components.

These advantages in addition to other objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

DETAILED DESCRIPTION OF THE PREFERRED EMBODIMENTS

This invention provides a process and method for the removal of suspended fat and/or protein components along with soluble fat and/or protein components (whether present with other organic materials or not). Consequently, when this description and claims refer to "fat and protein components", it means suspended and/or soluble fat and/or suspended and/or soluble protein containing components. Typically, these fat and protein components can be measured in a solution as Chemical Oxygen Demand ("COD") or Biological Oxygen Demand ("BOD"). For the purposes of this invention these two designations, COD and BOD, will be used interchangeably. Typically, the present invention will be used on water based solutions to remove the fat and protein components, however, one skilled in the art should recognize the present invention is not strictly limited to water based solutions.

This invention provides a process for precipitation and removal of suspended fat and protein components and other suspended solids from a given solution. This process utilizes the ionic complex aluminate ($Al(OH)_4^-$) as a complexing agent to interact or complex with the fat and protein components. One skilled in the art will recognize that while sodium aluminate will be the most common compound added to the process, that any aluminate salt can be used. Likewise, while the preferred process embodiment does not require the use or addition of other transition or alkaline earth metals and their complexes to facilitate removal of the fat and protein components, the scope of the invention is not limited to processes where only aluminate is present and/or added.

It is presently believed that formation of aluminate/fat and protein interactions or complexes, whether other cations or anions are also involved, produces charged compounds. Further, it is presently believed that the insoluble flocculate is created when the flocculating agent interacts with the charged compounds to produce a large, uncharged and therefore insoluble particle within the solution.

Presently, the use of anionic organic polymeric flocculating agents represents the most preferred embodiment of the present invention. Additionally, since the quantity of aluminate and solution pH can be readily manipulated, it is possible, and within the scope of the present invention, to also use cationic flocculating agents to interact with the aluminate and fat and protein complexes to produce similar results to those described with the anionic flocculating agents.

Different types of organic flocculating agents can be employed to produce the desired precipitation. Typically, large synthetic polymers such as polyacrylamides, polycarboxylates, and polyamines will be used depending on the quantity of aluminate used and the solution pH desired when the insoluble flocculate is form. Additionally, naturally occurring polymers, such as the polycarboxylate known as pectin, can also be used as a flocculating agent to provide an all "natural" process free of "man-made" chemicals.

One skilled in the art will recognize that where an anionic polymer flocculating agent, such as a polyacrylamide or a polycarboxylate, is employed to create the flocculate, the pH of the solution will preferably be above about 5 when the flocculate is formed. Where the pH is below about 5, the protonation of the anionic flocculating agent inhibits its ability to interact with the aluminate/fat and protein complexes. This pH above about 5 will allow the interaction between the anionic flocculating agent and the aluminate/fat and protein complexes needed to create the desired uncharged insoluble flocculate. It has also been determined that while some flocculation of the fat and protein components can be accomplished with the solution pH above about 10 that the efficiency of the process is reduced. Consequently, in order to minimize the quantity of materials required in the process, the preferred solution pH will be between about 5 and 10 and the more preferred solution pH will be between about 5.5 and 8 when the flocculate is formed. Additionally, as demonstrated in the examples, since the aluminate will act as a base and raise the solution pH, it has been found that adjusting the solution pH to between about 4.5 and 6.5 prior to the addition of the aluminate will create a solution pH between about 5.5 and 8 after addition of the needed quantity of aluminate.

Where the solution pH is adjusted to between about 4.5 and 6.5 prior to the addition of the aluminate and an anionic flocculating agent is employed, it has been determined that aluminate added in the range of between about 30 and 150 ppm with about 1 to 20 ppm anionic flocculating agent subsequently added will provide optimal removal of the fat and protein components. Even more optimally for flocculate creation from the fat and protein components are the concentrations of between about 50 and 100 ppm of aluminate with between about 7 to 15 ppm of flocculating agent. One skilled in the art should recognize that while these ranges of aluminate concentration and flocculating agent may provide for optimal flocculate creation, that the scope of the invention is not restricted to these ranges.

Further, where a cationic polymer flocculating agent, such as a polyamine, is employed to create the desired flocculate, the pH of the solution will preferably be below about 8 for optimal interaction between the cationic polymer and the aluminate which leads to the desired insoluble flocculate, although since the cationic flocculating agents are not as pH sensitive as their anionic counterparts, the cationic flocculating agents are capable of effective removal up to about pH 9–10. However, where the solution pH is reduced to below about pH 4 the ability of the aluminate to form the needed interaction with the fat and protein components diminishes. Therefore, substantially more aluminate will be required to produce the needed aluminate and fat/protein interaction or complex thereby making the process more expensive. Further, as the pH is reduced substantially below about pH 4 the aluminate and fat/protein interaction becomes weak and the overall process efficiency diminishes dramatically. Thus, when a cationic flocculating agent is employed the preferred pH range will be between about 4 and 10 and the more preferred pH range being between about 4 and 8.

Once the aluminate and fat/protein complex is formed, the subsequently added polymeric flocculating agent then interacts with the complexed fat and protein components to produce a large neutral aggregate which readily precipitates out of the solution. The creation of these large floc particles also causes the other suspended particles, such as silica, to be incorporated into the precipitated particles resulting in the removal of the other suspended solids out of the solution as well. This precipitate or coagulate can now be readily removed by any method known in the art such as filtration or settling or flotation.

With the fat and protein components now precipitated by the aluminate and removed from the process stream, the process stream's water poses substantially less of an environmental threat upon its discharge into natural waterways, or else can be recycled or otherwise reused as desired within existing process.

Once the flocculated fat and protein components are separated from the process stream, they typically can be used directly as animal feed. Additionally, through the process of rendering, the flocculated fatty materials are melted, noncomplexed water driven off and the melted fats can be separated into a tallow with the remaining protein rich materials used as animal feed. Because the aluminate does not contribute to the auto-oxidation of the fatty substances within the flocculate particles, the recovered tallow better maintains its value.

Examples of different preferred embodiments of the invention are provided below. These examples are not at all intended to limit the scope of the present invention, but instead serve to show a few of the nearly infinite variations on the process steps. Furthermore, one skilled in the art will recognize that the percentages of lowering of the COD content can be diminished or increased with changes in the quantities of aluminate and/or flocculent added. These examples in no way are intended to limit the quantity, either absolute or relative, or type of reactants added or to define or limit, in anyway, the type or source of fat and protein components which can be treated by the present invention.

EXAMPLE 1

Waste water from a beef slaughterhouse processing facility was found to contain COD of 8,800 ppm and TSS of 2,500 ppm. The pH of a 1.0 liter sample was adjusted to approximately 5.2. Approximately 60 ppm of sodium aluminate ($Na[Al(OH)_4]$) was added which raised the solution pH to approximately 6.5. Subsequently 4.0 ml of a 0.25% solution of anionic polyacrylamide polymer (approximately 10 ppm) was added which created a thick flocculate which was separated from the solution. The COD of the supernate was 1,500 ppm and the TSS of the supernate was measured at 45 ppm. The fat/protein flocculate was readily renderable.

EXAMPLE 2

Waste water from a turkey processing facility was found to contain COD of 5,500 ppm which consisted of approximately 73% fat and 27% protein. The pH of a 1.0 liter sample was adjusted to approximately 5.2. Approximately 80 ppm of sodium aluminate ($Na[Al(OH)_4]$) was added which raised the solution pH to approximately 6.8. Subsequently 4.0 ml of a 0.25% solution of anionic polyacrylamide polymer (approximately 10 ppm) was added which created a thick flocculate which was separated from the solution. The COD of the supernate was measured at 165 ppm. The fat/protein flocculate was readily renderable.

EXAMPLE 3

Waste water containing milk fat and proteins from a dairy with a pH of 5.2 was treated by the addition of approximately 50 ppm of Na[Al(OH)4], which raised the pH of the solution to approximately 5.7, followed by the addition of approximately 10 ppm of a cationic polyacrylamide polymer. A flocculent formed rapidly reducing the COD content of the filtered solution by 80%.

EXAMPLE 4

Waste water from a frozen dinner manufacturing facility was found to contain suspended solids which were approximately 79% fat and 21% protein. The total COD content of the water was measured at 1650 ppm. The pH of the water was adjusted to approximately 5.5, followed by the addition of approximately 50 ppm of sodium aluminate which raised the pH to approximately 6.4. Approximately 8 ppm of a cationic polymer was then added which created a flocculent, The COD of the supernate was measured at approximately 330 ppm, which represents an approximately 80% COD reduction.

EXAMPLE 5

Waste water from a meat processing facility was found to contain a COD content of approximately 9160 ppm. The solution pH was adjusted to pH 5.1, approximately 100 ppm of sodium aluminate was added which raised the pH to approximately 8.1. Approximately 10 ppm of an anionic polymer was added creating a flocculent. The COD content of the supernate was found to be approximately 1870 ppm.

EXAMPLE 6

Waste water from a beef slaughterhouse processing facility contains COD of 8,800 ppm and TSS of 2,500 ppm. The pH of the solution is adjusted to approximately 5.2. Approximately 60 ppm of sodium aluminate ($Na[Al(OH)_4]$) is added will raise the solution pH to approximately 6.5. Subsequently approximately 10 ppm of pectin is added to the solution which will create a flocculate which can be separated from the solution. The COD of the supernate will be approximately 1,500 ppm and the TSS of the supernate will be approximately 45 ppm. The fat/protein flocculate will be readily renderable.

Although preferred embodiments of the invention are described herein in detail, it will be understood by those skilled in the art that variations may be made thereto without departing from the spirit of the invention or the scope of the claims.

What is claimed and desired to be secured by United States Letters Patent is:

1. A method for removing COD created by fat and protein components from an aqueous dairy waste stream, said method comprising:

adjusting said waste stream to a pH of between about 4.5 and 6.5;

treating said waste stream with an aluminate wherein the aluminate treatment raises said pH from between about 4.5 and 6.5 to between about 5 and 10, and said pH is not reduced below 4.5 prior to treating with said aluminate;

adding an anionic flocculating agent to said waste stream in order to form a plurality of insoluble flocculate particles which contain said fat and protein components; and removing said COD by separating at least a portion of said insoluble flocculate particles from said aqueous waste stream.

2. A method according to claim 1 wherein said aluminate treatment raises said waste stream pH from between about 4.5 and 6.5 to between about 5.5 and 8.

3. A method according to claim 2 wherein said aluminate treatment adds an aluminate concentration within said waste stream of between 30 and 150 ppm to said waste stream.

4. A method according to claim 2 wherein said anionic flocculating agent addition adds an anionic flocculating agent concentration within said waste stream of between 1 and 20 ppm to said waste stream.

5. A method according to claim 1 wherein said aluminate treatment adds an aluminate concentration within said waste stream of between 50 and 100 ppm to said waste stream.

6. A method according to claim 1 wherein said anionic flocculating agent addition adds an anionic flocculating agent concentration within said waste stream of between 7 and 15 ppm to said waste stream.

7. A method according to claim 1 wherein said removed insoluble flocculate particles are further rendered to produce a tallow.

8. A method according to claim 1 wherein said flocculating agent is a naturally occurring polymer.

9. A method according to claim 8 wherein said flocculating agent is pectin.

* * * * *